United States Patent
Fraioli et al.

[15] 3,644,145
[45] Feb. 22, 1972

[54] INCORPORATION OF VALVE METALS INTO CURRENT-PRODUCING CELL CONSTRUCTIONS

[72] Inventors: Anthony Vincent Fraioli, Essex Falls, N.J.; John Phillip Mohns, Stamford, Conn.

[73] Assignee: American Cyanamid Company, Stamford, Conn.

[22] Filed: Oct. 2, 1969

[21] Appl. No.: 863,347

[52] U.S. Cl. ................................................ 136/6, 136/83 R
[51] Int. Cl. .............................................................. H01m 35/00
[58] Field of Search .................. 136/6, 83, 86, 175, 178, 57, 136/120, 13, 14, 135

[56] References Cited

UNITED STATES PATENTS

| | | | |
|---|---|---|---|
| 3,251,718 | 5/1966 | Hilton | 136/86 |
| 3,099,899 | 8/1963 | Horn et al. | 136/57 X |
| 3,256,117 | 6/1966 | Howatt et al. | 136/178 |
| 3,040,117 | 6/1962 | Jammet | 136/175 |
| 3,235,408 | 2/1966 | Harris | 136/6 X |
| 3,415,687 | 12/1968 | Methlie | 136/83 X |
| 3,423,242 | 1/1969 | Meyers et al. | 136/6 |
| 2,856,446 | 10/1958 | McCallum | 136/57 X |
| 2,954,417 | 9/1960 | Lehovec et al. | 136/13 |
| 3,436,270 | 4/1969 | Oswin et al. | 136/86 |
| 3,444,004 | 5/1969 | Smith | 136/120 |

*Primary Examiner*—Anthony Skapars
*Attorney*—Gordon L. Hart

[57] ABSTRACT

In electrochemical current-producing cells having nonaqueous electrolyte solutions, metal parts of the positive electrode which contact the electrolyte are of a valve metal, e.g., aluminum, coated with a corrosion-resistant film of the valve metal oxide.

13 Claims, No Drawings

INCORPORATION OF VALVE METALS INTO CURRENT-PRODUCING CELL CONSTRUCTIONS

The invention relates to current-producing electrochemical cells and more particularly to improvements in such cells of the kind having a substantially anhydrous electrolyte solution.

Cells comprising anhydrous electrolyte solutions are described, for example, in U.S. Pat. application Ser. No. 669,373 filed Sept. 21, 1967, by A. K. Hoffman and in corresponding patents: Belgium Pat. No. 670,775, French Pat. No. 1,554,562, and United Kingdom Pat. No. 1,045,228. Hoffmann discovered that sulfur dioxide improves ion conductivity of essentially nonaqueous electrolyte solutions. D. L. Maricle and J. P. Mohns, in U.S. Pat. application Ser. No. 735,971, filed June 11, 1968, now abandoned, and corresponding Belgium Pat. No. 705,559, French Pat. No. 1,541,885, and United Kingdom Pat. No. 1,100,163, disclosed the utility of sulfur dioxide as a cathode depolarizer in substantially nonaqueous cells. The present invention is an improvement in substantially nonaqueous cells such as those which have sulfur dioxide as an essential component of the nonaqueous electrolyte solution, for example, in the Hoffmann cells or in the Maricle and Mohns cells mentioned above, but the invention is not necessarily limited in all its aspects to cells comprising sulfur dioxide.

In cells having a consumable metal anode and a substantially nonaqueous electrolyte solution a serious corrosion problem is encountered with most metals that are part of the positive electrode structure, i.e., metals of the cathode current collector, its connector and terminal parts and the like, and which are in contact with the nonaqueous liquid electrolyte solution. This problem becomes quite serious in the presence of nonaqueous solutions containing halide ions. Except for the noble metals, e.g., platinum, most of the battery construction metals ordinarily suitable for the positive electrode such as iron and its alloys, silver, copper, nickel, lead, and the like will be rapidly corroded when used in any part of the positive electrode that contacts the nonaqueous electrolyte solution. A select class of metals, which we call "valve metals" is found to resist such corrosion very effectively by means of a passivating film which is formed on the surfaces that contact the electrolyte. In accordance with the present invention, in a primary or secondary cell having a positive electrode, a negative electrode and a substantially nonaqueous electrolyte solution, the metal parts of the positive electrode (i.e., all metal parts in electron conductive contact with the cathode of the current-producing cell) that are in direct surface contact with the electrolyte solution are made of a valve metal and have a passivating oxide film on the metal surfaces contacting the electrolyte. A valve metal is a metal which forms a corrosion-resistant, passivating metal oxide film on its metal surface by electrolytic anodization. The film will form spontaneously when the metal electrode is placed in the electrolyte solution. Even in most so-called anhydrous electrolytes there is sufficient residual or absorbed water to effect this anodization. When an absolutely anhydrous electrolyte solution is used, it is preferable to anodize the positive electrode parts prior to cell assembly, to preform the passivating oxide film. This preforming anodization may also be preferred in making cells for operation at voltages above 3 volts on either charge or discharge, or for operation under extreme conditions which require maximum corrosion resistance. The oxide film can be formed, for example, by anodization of a valve metal such as aluminum in 3 percent boric acid aqueous solution at 85° C. using 100-volt anodizing potential. This oxide film, once formed, effectively prevents transfer of valve metal ions (corrosion) through the film-coated surfaces contacting such electrolyte solution. This protective semiconductive film does not prevent transfer of electrons at the oxidized surface. The class of valve metals includes aluminum, which is especially preferred, as well as, tantalum, molybdenum, tungsten, niobium (columbium), alloys of two or more of those elemental metals, and other alloys which comprise a significant proportion of at least one of those elemental metals and which form the protective oxidized semiconductive coat as described. A principal advantage of using a valve metal for all of the cathode-connected metal parts that contact the electrolyte in the cell, is the substantial elimination of what, with another ordinary metal such as iron or steel, copper, silver, and the like, would be a serious galvanic corrosion problem.

In various embodiments, the invention may be used in any of a variety of primary and secondary electrochemical cells which comprise nonaqueous electrolyte solutions. In the most preferred embodiments, the invention is used in such cells having lithium or sodium anodes with a carbon or other electron conductive cathode and using sulfur dioxide from the electrolyte solution as the cathode depolarizer. The invention, however, is applicable more broadly to any current-producing cell having a positive electrode with metal parts that contact an essentially nonaqueous electrolyte solution. Use of valve metals as noncorrosive parts of the positive electrode structure is economically advantageous over the use of other noncorrosive metals such as noble metals which are generally much more expensive. More generally available metals such as copper, nickel, iron, etc., are subject to corrosion by anodization when used instead of the valve metals. Aluminum is an especially suitable valve metal because of its excellent electron-conductivity, ready availability and economy, and its suitable metalworking characteristics.

In especially preferred embodiments, the valve metal parts of the positive electrode comprise a current collector screen in the conductive cathode material, e.g., in a body of conductive porous carbon, a positive terminal, and a cathode-terminal connector, which may be, for example, a connecting wire or a tab extended either from the positive terminal or from the current collector, for connecting the cathode to the terminal. In some embodiments, the positive terminal is an electrically insulated member of the cell enclosure, for example, a closure disc sealed and electrically insulated in one end of a cylindrical cell enclosure can. In other embodiments, the terminal may be a metal plug, wire, or the like extended through the cell enclosure and sealed as by a glass to metal or ceramic to metal seal. Following is a detailed example including a description of the presently most preferred mode of carrying out the invention. Within the scope of the invention, other variations and modifications not specifically described can be made.

EXAMPLE 1

An electrode coil is prepared as follows. A paper cathode sheet consisting of a water-laid web of asbestos fibers and conductive carbon particles on an aluminum expanded metal screen which serves as a current collector and scrim, is made as described in Example 1 of U.S. Pat. application Ser. No. 781,577 filed Dec. 5, 1968 now U.S. Pat. No. 3,551,205, by A. V. Fraioli et al. A strip is cut to size from the paper cathode sheet for making the cathode of the electrode coil. A sheet of lithium foil is pressed firmly onto a sheet of copper expanded metal screen and from the composite anode sheet is cut a strip the size for making the anode of the electrode coil. The anode strip and the cathode strip are then laid in a sandwich with porous noncellulosic, electrolyte-permeable dielectric separator strips separating the electrode surfaces and covering each outer side of the sandwich. The resulting sandwich is wound from one end of the sandwich strip into a rolled coil. The anode is the outer one of the two electrodes in the coil. Conductive tabs, conductively secured to the metal screen of each electrode extend outward from one end of the wound coil, a copper tab from the copper screen of the anode and an aluminum tab from the aluminum screen of the cathode. The rolled electrode coil is fitted into a hollow cylindrical steel can which has been sealed shut at one end and is open at the other end of the cylinder. The anode tab of copper is conductively connected, as by welding, to the inner wall of the cylindrical steel can. The cylinder wall at the open end of the can extends beyond the end of the electrode coil positioned in the can, for a distance sufficient to permit closing the can by a suitable seal closure. The aluminum cathode tab is conductively connected to an aluminum closure disc. This closure disc has a narrow aluminum tube extending outward at the center of the circular aluminum disc, normal to the disc surface and defining an inner passage for fluid through the tube and disc. After the disc has been connected to the anode tab the disc is fitted snugly into the open end of the steel can with the peripheral edge of the disc insulated from the can by an electrically insulating elastomeric neoprene ring between the edge of the disc and the wall of the can. The disc is sealed into the end of the can by deforming the cylindrical wall of the can tight around the insulating elastomeric ring and peripheral edge of the disc. Details of a seal of this kind are shown for example in U.S. Pat. No. 3,256,117 patented June 14, 1969, by G. N. Howatt.

Through the described passage in the tube and disc, the interior of the can is first evacuated of air then filled with a nonaqueous electrolyte solution which has been prepared by mixing 164.2 gms. acetonitrile, 130.5 gms. propylene carbonate, 160 gms. lithium bromide and 1073 gms. sulfur dioxide. This solution, though substantially anhydrous contains enough entrained water to effect the film formation. When the cell is filled with electrolyte solution and suitably pressurized the aluminum filling tube is pinched shut, closing the fluid passage and sealing the inside of the cell. The tube walls are pressed sufficiently to cold weld the walls and permanently shut the passage and finally seal the cell closure. The tube is then cut off above the cold weld. In the finished cell of this example the positive electrode consists of the coiled cathode, the cathode tab and the closure disc which is the positive terminal member of the cell enclosure, all electrically insulated from the negative electrode which consists of the coiled anode, anode tab and the steel can which is the negative terminal member of the cell enclosure. The cell described is tested and original open circuit voltage is about 2.8 volts. In performance and capacity tests the cell is discharged at one-fourth ampere steadily to 1.8 volt cutoff. Average voltage on this test is 2.7 volts. Specific energy on test is about 135 watt hours per pound.

In the cell described, all metal members of the positive electrode that contact the $SO_2$-containing electrolyte are of aluminum, namely, the aluminum current collector screen in the paper cathode, the aluminum cathode tab and the aluminum cover disc which is the positive terminal of the cell. In a variation of this example also embodying the invention, a reinforcing steel disc is placed against the outer flat side of the aluminum disc, with a concentric hole for the aluminum filling tube to pass outward through the steel disc. The two discs are sealed together into the cell closure by crimping the edges of both together within the circumferential seal formed by deformation of the cylinder wall around the disc edges, with an insulating gasket, as before. In this embodiment both the aluminum disc and the steel disc are in electron-conductive contact with the cathode, but only the aluminum one of the two discs contacts the electrolyte solution inside the cell enclosure. The steel reinforcing disc is not part of the inner wall of the cell enclosure, and hence is not subject to contact with and corrosion by the electrolyte.

When the cells made and tested as described in Example 1 are disassembled for inspection, the aluminum surfaces that have contacted the electrolyte are found to be covered with a very thin oxidized film which has prevented any substantial corrosion of the aluminum parts, even after long periods of storage. Other embodiments of the invention are made by the procedure described except the other valve metals, e.g., tungsten, tantalum, molybdenum, etc., are substituted for aluminum in the positive electrode. A protective oxidized film is found to form on the metal surfaces of these positive electrode valve metal parts where they contact the electrolyte solution, the same as in the case of aluminum, and the corrosion resistance is demonstrated by tests showing extremely low corrosion currents in each instance.

For comparison, cells are made and tested as in Example 1, but using steel, copper, silver and the like as metal parts for the positive electrode. Such cells are functional but such other metal parts of the positive electrode are subject to continuous corrosion by anodization, at varying rates depending on the selected metal. When these cells are stored for extended periods, the anodic corrosion of such metals is found to cause loss of capacity and, in some cases, complete failure of the cell due to corrosion. With valve metals, such corrosion is virtually eliminated.

We claim:

1. In an electrochemical current-producing cell which has a positive electrode, a negative electrode comprising a consumable anode metal and contacting said positive and negative electrodes a liquid solution of electrolyte in essentially anhydrous liquid solvent comprising sulfur dioxide, the improvement wherein the metal components of said positive electrode in surface contact with said electrolyte consist essentially of valve metal with a passivating surface film of the valve metal oxide.

2. An improved electrochemical cell defined by claim 1 wherein said valve metal consists essentially of aluminum.

3. In an electrochemical current-producing cell comprising a cell enclosure and enclosed therein an anode of consumable anode metal connected with a negative terminal member of said cell enclosure and a cathode connected with a positive terminal member of said cell enclosure, said positive terminal member being electrically insulated from said negative terminal member, and contacting said anode and cathode inside said cell enclosure a liquid solution of electrolyte in essentially anhydrous liquid solvent comprising sulfur dioxide, the improvement wherein said positive terminal member and all of the metal components of said cathode at all of its surfaces in contact with said electrolyte solution consists essentially of valve metal with a passivating surface film of the valve metal oxide.

4. An improved electrochemical cell defined by claim 3 wherein said valve metal consists essentially of aluminum.

5. An improved electrochemical cell defined by claim 3 wherein the defined positive terminal member of said cell enclosure comprises a valve metal plate insulatingly sealed in said cell enclosure with the inner surface of said plate contacting the electrolyte solution inside said cell enclosure.

6. An improved electrochemical cell defined by claim 5 wherein the defined valve metal plate is a circular disc sealed in one end of, and electrically insulated from, a hollow cylindrical container which comprises the defined negative terminal member of said cell enclosure.

7. A cell defined by claim 6 wherein said disc is aluminum.

8. A cell defined by claim 7 wherein said disc comprises a concentric filling tube of aluminum attached to said disc and adapted for filling said cell enclosure with fluid through said tube and disc.

9. A cell defined by claim 1 wherein said anode is lithium.

10. A cell defined by claim 2 wherein said anode is lithium.

11. An improved cell defined by claim 1 wherein said positive electrode member comprises a porous carbon cathode with an incorporated valve metal current collector.

12. An improved cell defined by claim 11 wherein said valve metal current collector is of aluminum.

13. An improved cell defined by claim 12 wherein the defined anode is lithium.

* * * * *